United States Patent
Rao et al.

(10) Patent No.: US 7,746,349 B1
(45) Date of Patent: Jun. 29, 2010

(54) METHOD AND APPARATUS FOR DISPLAY OF DATA

(75) Inventors: Krishnaraj S. Rao, Bangalore (IN);
David G. Reed, Saratoga, CA (US);
Sean Jeffrey Treichler, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 301 days.

(21) Appl. No.: 11/083,695

(22) Filed: Mar. 16, 2005

(51) Int. Cl.
*G06T 1/60* (2006.01)
*G09G 5/39* (2006.01)
*G06F 13/28* (2006.01)

(52) U.S. Cl. ............... 345/531; 345/530; 345/533

(58) Field of Classification Search ............ 345/141, 345/143, 150, 192, 193, 194, 531, 532, 467, 345/530, 533; 395/150, 167; 704/254; 710/129; 711/130; 712/31, 35, 36, 208, 227, 242, 712/243; 702/132
See application file for complete search history.

(56) References Cited

U.S. PATENT DOCUMENTS

| 5,384,912 | A | * | 1/1995 | Ogrinc et al. | 345/501 |
|---|---|---|---|---|---|
| 5,396,588 | A | * | 3/1995 | Froessl | 715/542 |
| 5,444,840 | A | * | 8/1995 | Froessl | 707/2 |
| 5,539,428 | A | * | 7/1996 | Bril et al. | 345/471 |
| 5,642,136 | A | * | 6/1997 | Jayavant et al. | 345/467 |
| 5,742,298 | A | * | 4/1998 | Bril et al. | 345/501 |
| 5,758,105 | A | * | 5/1998 | Kelley et al. | 710/113 |
| 6,170,049 | B1 | * | 1/2001 | So | 712/35 |
| 6,906,721 | B1 | * | 6/2005 | Burrell | 345/581 |
| 7,243,041 | B2 | * | 7/2007 | Nalawadi et al. | 702/132 |
| 2002/0174318 | A1 | | 11/2002 | Stuttard et al. | |
| 2005/0088445 | A1 | * | 4/2005 | Gonzalez et al. | 345/502 |
| 2006/0066623 | A1 | * | 3/2006 | Bowen | 345/506 |

* cited by examiner

*Primary Examiner*—Amare Mengistu
*Assistant Examiner*—Aaron M Guertin
(74) *Attorney, Agent, or Firm*—Townsend and Townsend and Crew LLP (57) ABSTRACT

To display a row of characters in the VGA alphanumeric mode, the ASCII and attribute bits for all such characters are retrieved from the main memory and stored in a local cache memory. The font and unused bits that are also retrieved from the memory during the retrieval of ASCII and attribute bits are discarded. The stored ASCII and attribute bits for each such character is then used to compute the address of the associated font bits in the main memory. Next, for each character, the font bits are retrieved from the main memory using a burst read operation and using the computed address for that font. The font bits associated with all the characters in the row are stored in the local cache memory and are subsequently scanned out to be used in the display of the characters.

18 Claims, 7 Drawing Sheets

METHOD AND APPARATUS FOR DISPLAY OF DATA

FIELD OF THE INVENTION

The present invention relates to data display, and more particularly to a graphics controller configured to process graphics data for display on a monitor.

BACKGROUND OF THE INVENTION

Display monitors are often adapted to display characters using a number of different resolutions. Resolution refers to the number of pixels used within a given area to display an object or a character. A number of different standards are known. For example, the VGA standard requires a resolution of 640 pixels by 480 pixels.

Figure 1:
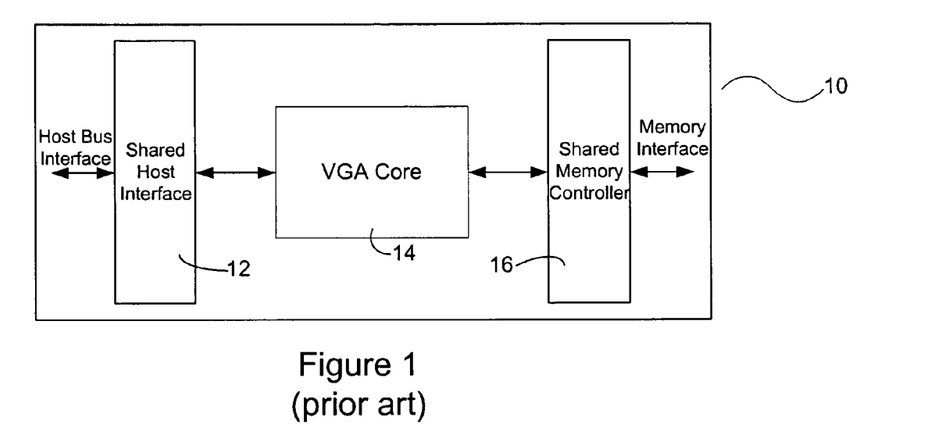
FIG. 1 is a logic block diagram of a VGA controller, as known in the prior art.
Figure 2:
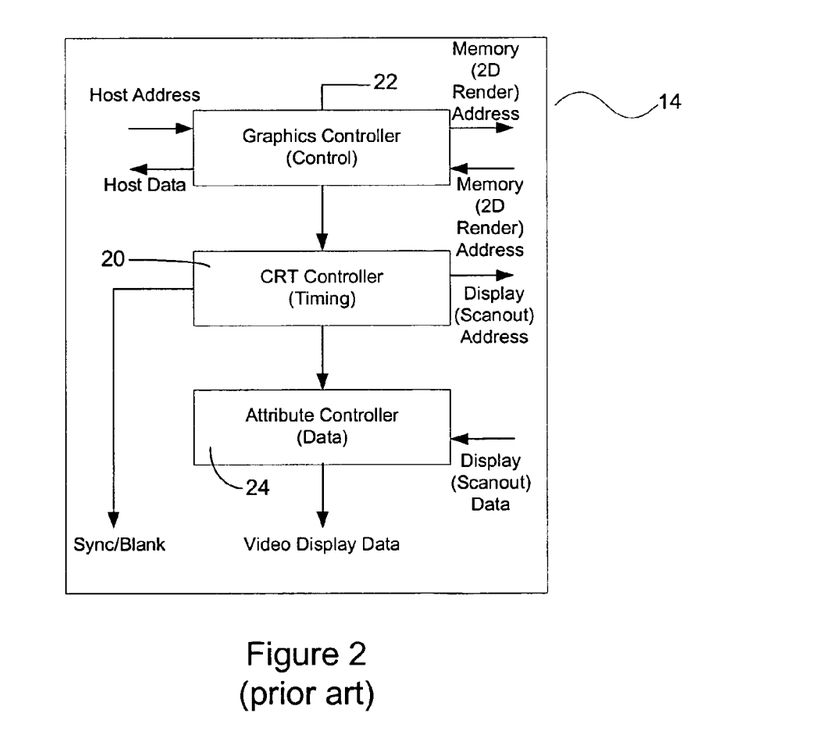
FIG. 2 is a logic block diagram of the VGA core disposed in the VGA controller of FIG. 1, as known in the prior art.

FIG. 1 is a logic block diagram of a VGA controller 10, as known in the prior art. VGA controller 10 is shown as including a VGA core 14 that is coupled to shared host interface 12 and shared memory controller 16. As shown, shared host interface 12 and shared memory controller 16 are respectively coupled to a host bus interface and a memory interface. FIG. 2 is a logic block diagram of VGA core 14, as known in the prior art. VGA core 14 is shown as including a CRT controller 20, an attribute controller 24 and a VGA graphics controller 22 adapted to handle two-dimensional operations.

Referring to FIG. 1, VGA controller 10 often operates in one of two modes, namely an alphanumerical mode or a graphics mode. In the graphics mode, the display data is flat, therefore, the memory planes contain bit patterns for each pixel displayed on the screen. The color of each pixel is individually specified and supplied directly to the color lookup table and delivered to the monitor.

Figure 3:
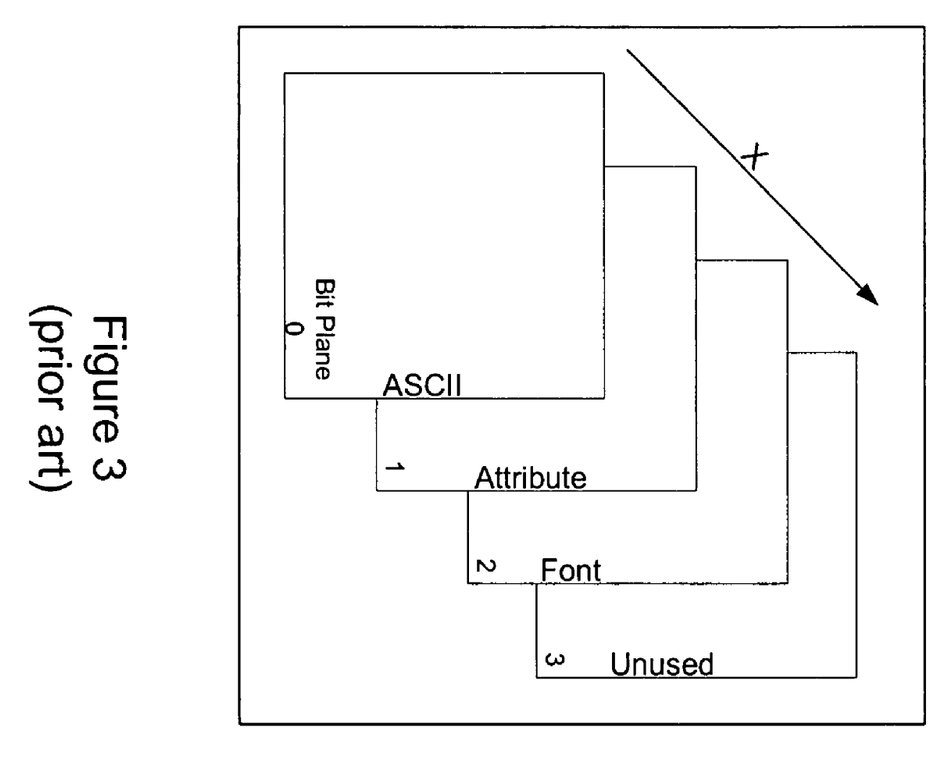
FIG. 3 shows the various memory planes associated with each character in the alphanumeric mode, as known in the prior art.

In the VGA alphanumerical mode, each character has an associated ASCII value, an attribute, a font, and an unused field. FIG. 3 shows the organization of memory bit planes associated with each character in the alphanumeric mode, as known in the prior art. The ASCII value associated with each character is typically represented by 8 bits ranging in value from, e.g., 00 Hex to FF Hex. For example, ASCII value for the alphabet "A" is represented by Hex value 20. Alphanumeric characters may be displayed in monochrome or a multitude of colors. The ASCII values are stored in plane 0 of the memory planes shown in FIG. 3.

In the monochrome alphanumerical mode, the characters may be represented, for example, in low or high intensity, or with underlines. In the color alphanumeric mode, one of a multitude of colors may be selected for the foreground as well as for the background. In addition, the characters in the color mode may be instructed to blink or be underlined. In either color or monochrome mode, a character attribute, which is typically represented in one byte, is stored in plane 1 of the memory planes shown in FIG. 3. The font associated with each character is stored in bit plane 2. Fields stored in bit plane 3 are not used in the standard VGA alphanumeric mode, but can be used to store proprietary information such as custom fonts, if necessary Each addressable location of the memory accessed by shared memory controller 16 is typically configured to store 32 bits. The first 16 bits of each address store the ASCII and the attribute bits associated with the same character; the remaining 16 bits of each memory address store the font and the unused bits that may be associated with the same or a different character.

Assume that the character to be displayed next is "T". To display this character, the memory address containing the ASCII and the attribute parameter values associated with character "T" is first accessed, resulting in retrieval of 32 bits, 16 bits of which represent the ASCII and the attribute values for character "T". The remaining 16 bits are discarded. The ASCII and attribute values are subsequently used to compute the memory address that contains the font parameter value associated with character "T". The computed memory address is subsequently accessed to retrieve the font value for character "T". During the retrieval of the font parameter value for character "T", ASCII, attribute and unused parameter values are also retrieved, and are discarded.

As is known to those skilled in the art, in the alphanumeric mode, 80 characters are typically displayed in each row, although there are 132-wide alphanumeric modes as well. Assume that the character font height corresponds to 8 scan lines, i.e., there are 8 scan lines per row. To display the characters, during a first memory access, the display data associated with the first 8 adjacent characters in the first scan line of the row are retrieved from memory planes 0-3. The font and unused bits of the retrieved data are discarded since they may not be associated with the first 8 adjacent characters in the row. The retrieved ASCII and attribute bits are subsequently used to compute the memory locations in which the fonts associated with the first 8 adjacent characters are stored. Next, using the computed memory locations, the first scan line of fonts associated with the first 8 adjacent characters are retrieved. The ASCII, attribute and unused bits that are also retrieved during the retrieval of the font bits, are discarded. This process is repeated 10 times until the ASCII, attribute and fonts bits for all of the 80 characters in the current scan line of the row are so retrieved.

Next, this process is repeated for each of the scan lines 2 though 8 of the current row. Therefore, for each of scan lines 2 though 8, the ASCII and attribute bits for each character are retrieved again to enable the retrieval of the font bits for the characters in that scan line. It is understood that the ASCII and attribute bits for each character is the same in all scan lines. With each memory access, either the font and unused bits is discarded, or the ASCII, attribute and the unused bits are discarded. Accordingly, because there are 80 characters displayed in each row in the VGA alphanumeric mode, a total of at least 20 memory accesses are made to retrieve the ASCII, attribute and font parameter values associated with the characters in each scan line of the row. Consequently, total of at least 160 memory accesses are made to retrieve the ASCII, attribute and font parameter values associated with the 80 characters in the 8 scan lines that form the row, thus to enable the display of these characters.

Figure 4:
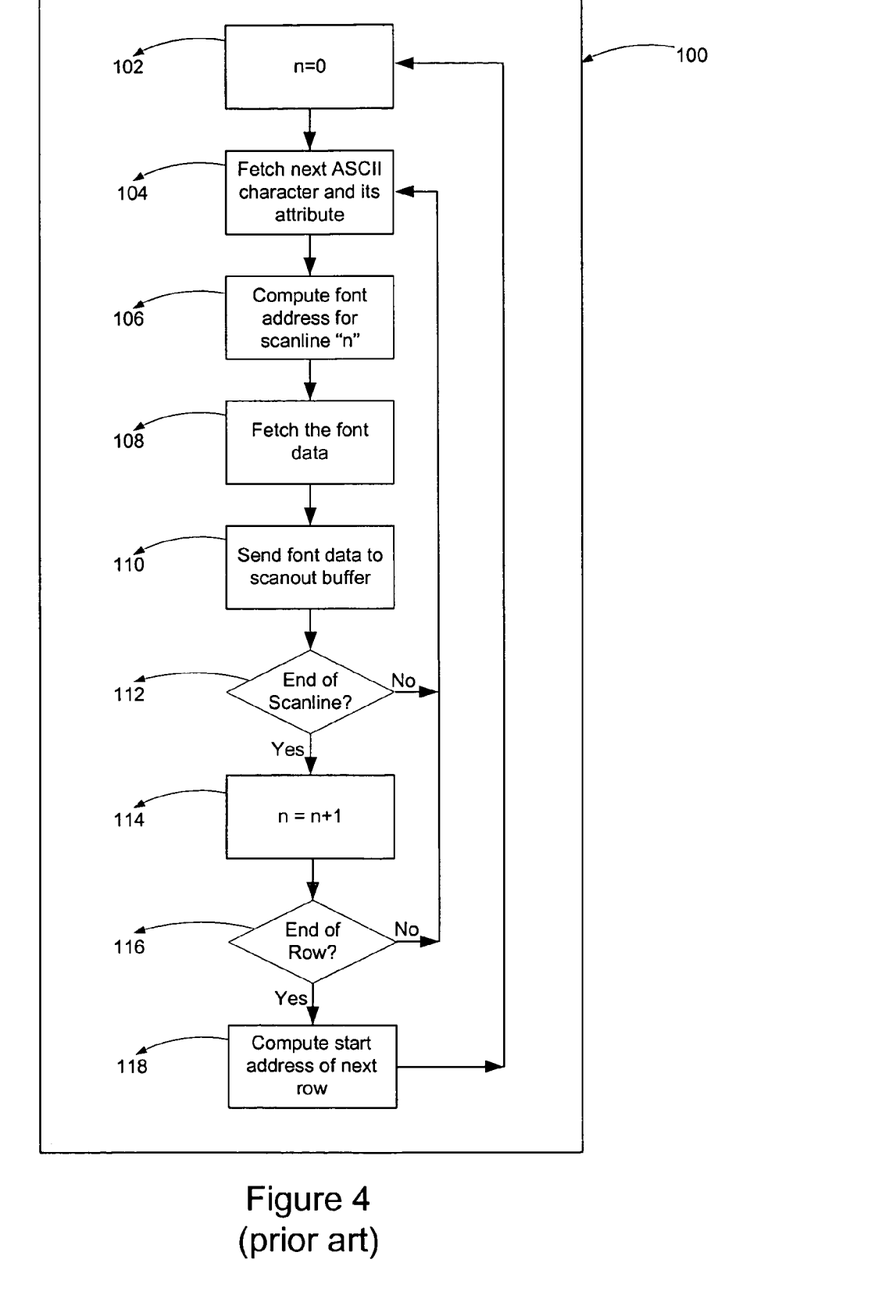
FIG. 4 is a flowchart of steps carried out by a VGA controller to display data in the alphanumeric mode, as known in the prior art.

FIG. 4 is a flowchart 100 of steps carried out by a VGA controller to display data in the alphanumeric mode, as known in the prior art. At step 102, a counter is reset to zero to indicate that processing of characters in the first scan line of a row is to begin. At step 104, the ASCII and attribute bits for the characters in the first row are fetched (i.e., retrieved) from the memory. At step 106, the font addresses for the characters in the first line are computed. At step 108, the fonts associated with the characters in the first line are fetched from the memory. At step 110, the fetched fonts are transmitted to the scan out buffer. At step 112, a determination is made as to whether the end of the current scan line has been reached. If not, then transition is made to 104, where more ASCII and attribute pairs are fetched. If yes, then transition is made to 114. At step 114, the counter's count is incremented to point to the next scan line. At step 116 a determination is made as to whether the data in all the scan lines have been processed. If not, transition is made to step 104 to fetch the ASCII and attribute bits associated with the next scan line of the row. If at step 116 it is determined that the data in all the scan lines of a current row have been processed, a transition is made to step 118 where the start address for the next row of characters is computed. From here, transition is made to 102 so as to allow the scan lines associated with the next row of characters to be processed and displayed on the monitor.

As seen from the above descriptions, in the prior art systems, the repeated retrieval and discard of the same ASCII and attribute data results in performance inefficiencies. Moreover, in such systems, font bits for each character is retrieved one scan line at a time further resulting in performance degradations. Furthermore, the multiple memory accesses required to fetch the font bits may cause the overall memory latency to become unacceptably large, thus resulting in screen tear. To handle this latency, the memory controller is often disposed in the same integrated circuit as that which includes the VGA controller, thus enabling the guarantee of a minimum read latency in such systems. This allows the requirements of isochronous clients, such as a VGA controller, to be built into the design of the memory controller. However, prior art systems are not adapted to support the relatively large latency that comes about if the VGA controller and the shared memory controller are formed in two separate integrated circuits.

BRIEF SUMMARY OF THE INVENTION

In accordance with the present invention, to display characters in a row of a display monitor in the VGA alphanumeric mode, the ASCII and attribute bits for all the characters (i.e., 80 characters) in the row are retrieved from the main memory and stored in a local cache memory. Therefore, for each character, the main memory is accessed once to retrieve the character's associated ASCII and attribute bits. The font and unused bits that are also retrieved from the memory during the retrieval of ASCII and attribute bits are discarded. The ASCII and attribute bits for each such character are then used to compute the address of the associated font bits in the main memory. Next, for each character, the font bits are retrieved from the main memory using a burst read operation and using the computed address for that font. Accordingly, there is at most one cache miss per the entire font bitmap retrieved from the main memory. The retrieved fonts are stored in the cache memory and are subsequently scanned out to be used in the display of the characters.

In some embodiments, the fonts associated with the characters in a second row are also retrieved in the same manner and are also stored in the local cache memory. The storing of the fonts associated with the characters in the second row may occur while the fonts associated with the characters in the first row remain stored in the same local cache, or may alternatively occur while the fonts associated with the characters in the first row are scanned out to be displayed.

In some embodiments, the ASCII and attribute bits associated with the characters in the second row are also retrieved and stored in the local cache while the ASCII and attribute bits associated with the characters in the first row remain stored in the same local cache.

DETAILED DESCRIPTION OF THE INVENTION

Figure 5A:
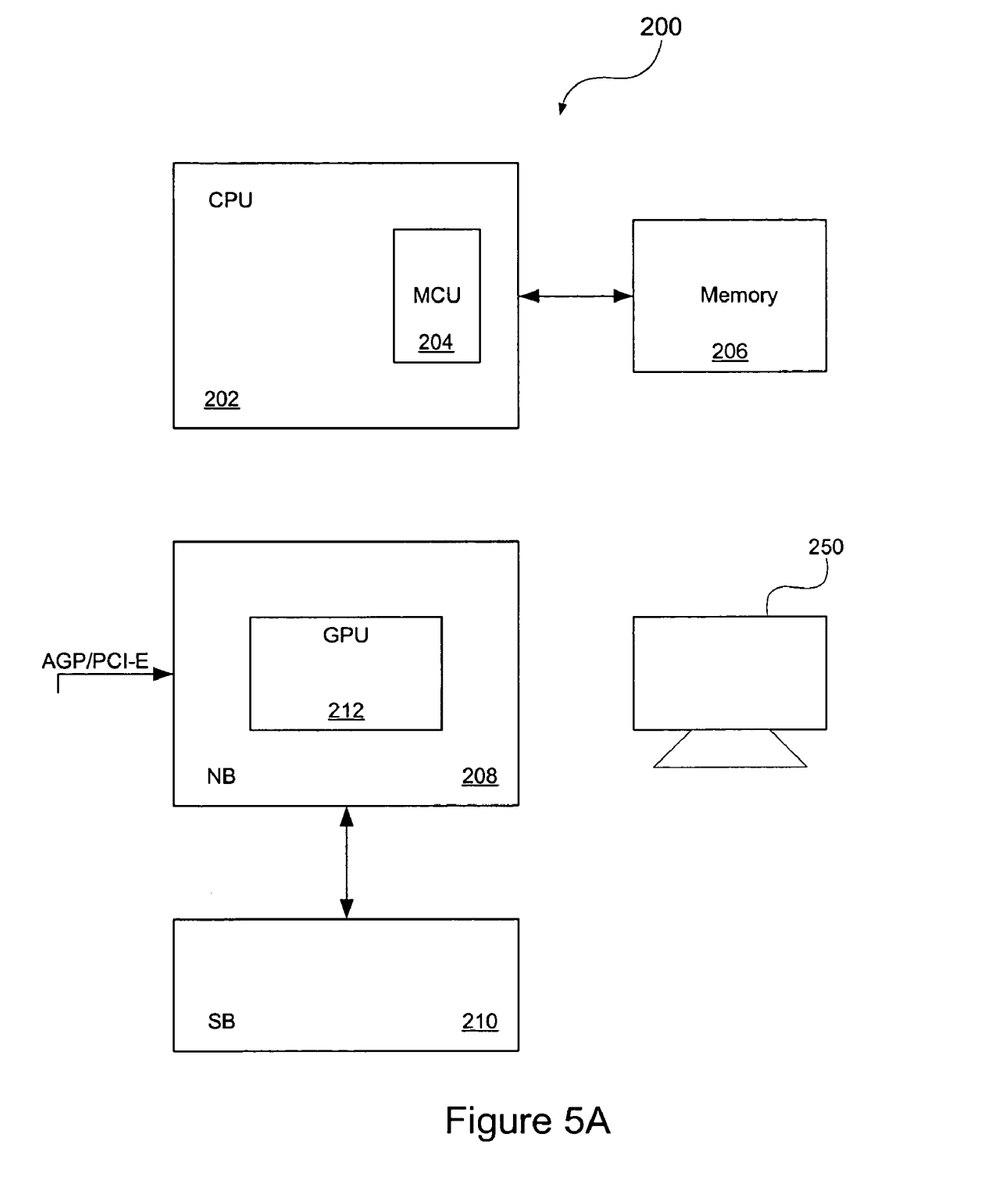
FIG. 5A is a simplified high level block diagram of a computer system having disposed therein a VGA controller, in accordance with one embodiment of the present invention.

FIG. 5A is a simplified high level block diagram of a computer system 200 in which the present invention may be embodied. Central processing unit (CPU) 202 is coupled to main memory 206 and to a Northbridge integrated circuit (IC) 208, which in turn, is coupled to an access controller 210 (e.g., a Southbridge integrated circuit). Northbridge 208 further includes a graphics processing unit (GPU) and is configured, in part, to process graphics data. Access controller 210 is configured, in part, to handle media access operations (MAC). In computer system 200, memory controller unit (MCU) 204 is disposed in CPU 202. CPU 202 may be an eight generation microprocessor, such as the Opteron™ processor available from Advanced Micro Devices, located at One AMD Place, Sunnyvale, Calif. 94088, USA. GPU 212 supplies data for display on monitor 250.

Northbridge 208 is shown as including a graphics processing unit (GPU) 212 and is also shown supporting an AGP or PCI-E bus, to which an external video adapter may be coupled. GPU 212 is configured to retrieve data from memory 206, process the retrieved data and store the processed data back in memory 206. GPU 212's access to memory 206 for either read or write operations is carried out via MCU 204. Because in the embodiment shown in FIG. 5A, MCU 204 is disposed in CPU 202, relatively large read and write latencies from and to memory 206 may result. In some embodiments, GPU 212 may be configured to perform computationally intensive operations for both non-graphics as well as graphics applications.

Figure 5B:
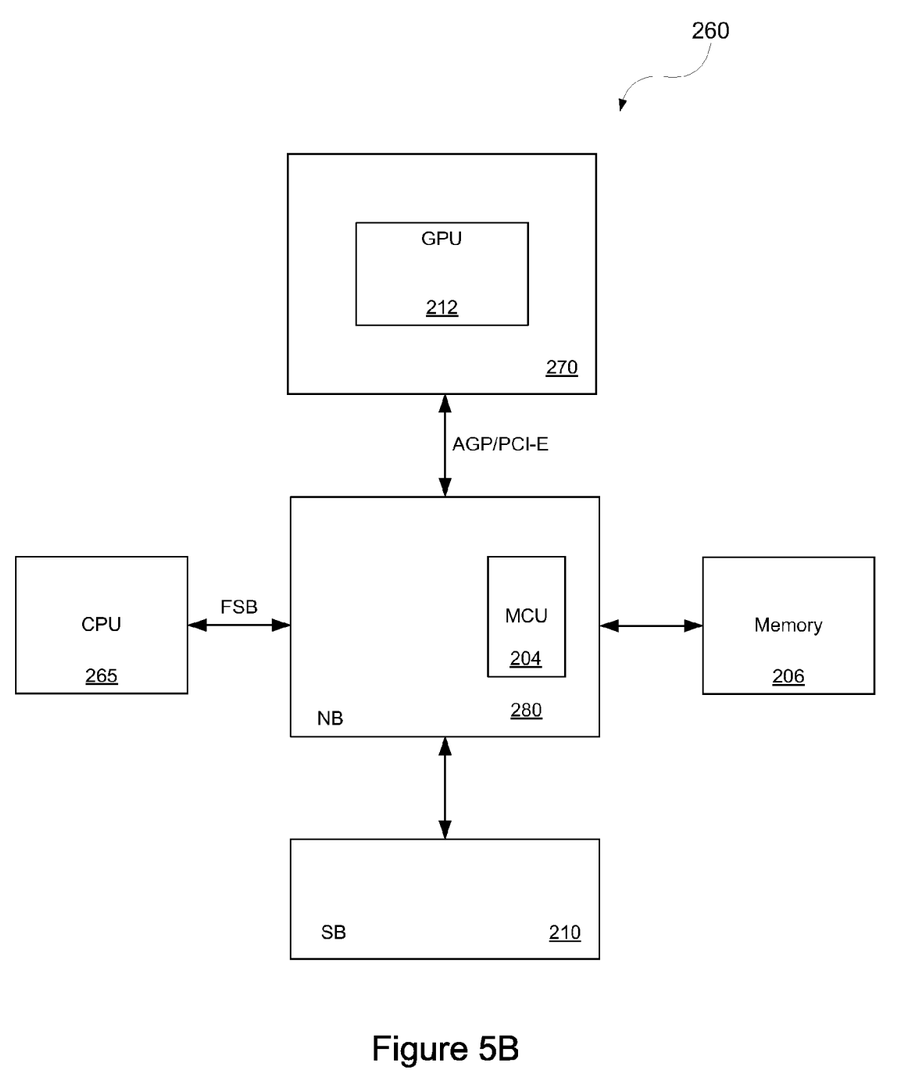
FIG. 5B is a simplified high level block diagram of a computer system having disposed therein a VGA controller, in accordance with another embodiment of the present invention.

FIG. 5B is a simplified high level block diagram of another computer system 260 in which the present invention may be embodied. CPU 265 is coupled to Northbridge IC 280 via Front Side Bus (FSB). MCU 204—disposed in Northbridge IC 280—provides an interface to main system memory 206. Northbridge IC 280 is shown as being coupled to video adapter 270 via AGP/PCI-E bus. Northbridge IC 280 is also coupled to access media controller (e.g., Southbridge IC) 210. Video adapter 270, which may be an add-in card, is shown as including GPU 212. To gain access to data stored in memory 206, video adapter 270 sends access requests to Northbridge IC 280—via AGP/PCI-E bus—which is the final arbiter for all accesses to memory 206. Northbridge IC 280 and Southbridge IC 210 are available from a number of vendors, such as the Intel corporation, which is located at 2200 Mission College Boulevard, Santa Clara, Calif. 95052, USA, or NVIDIA corporation, which is located at 2701 San Tomas Expressway, Santa Clara, Calif. 95050, USA.

Figure 6:
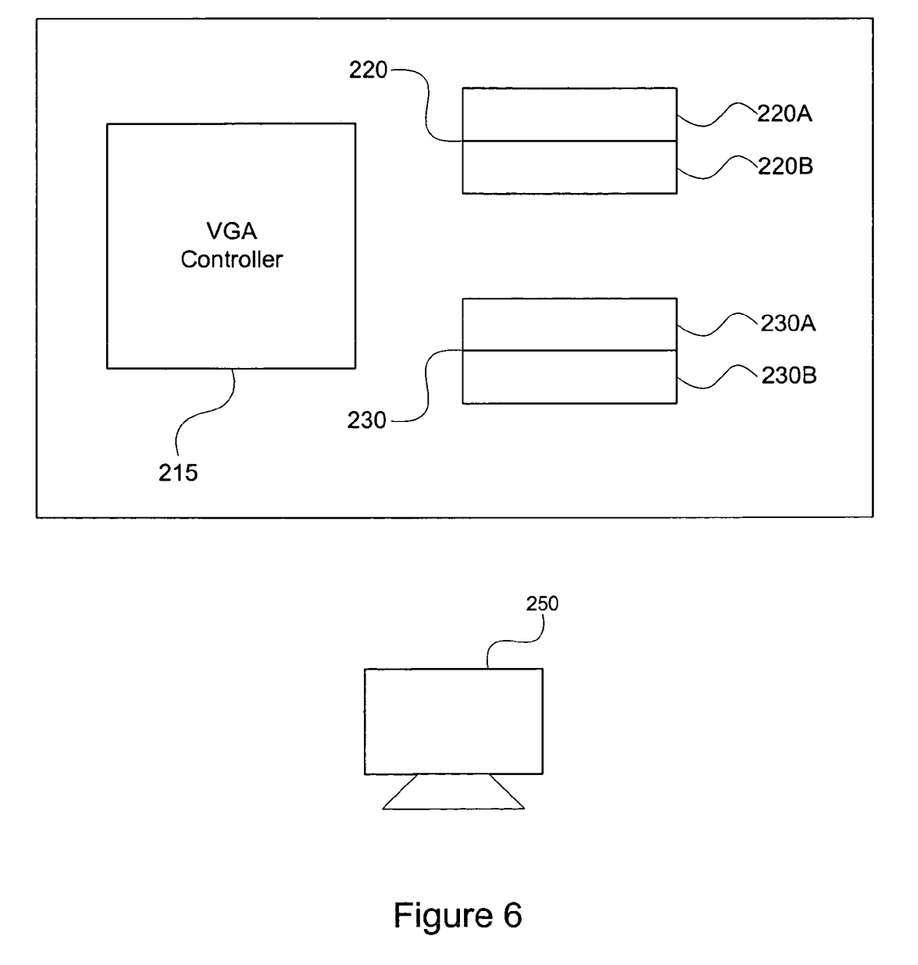
FIG. 6 is a simplified high level block diagram of the graphics processing unit disposed in the computer system of FIGS. 5A and 5B.

FIG. 6 is a simplified block diagram of GPU 212, which is shown as including a VGA controller 215, and a pair of cache memories 220, and 230, each of which includes a number of storage locations.

Referring concurrently to FIGS. 5A, 5B and 6, parameter values associated with characters to be displayed on monitor 250 during the VGA alphanumeric mode, are typically stored in and are thus first retrieved from memory 206. These parameter values include ASCII, attribute, font and unused values each represented by a number of bits. The unused bits are not used in the alphanumeric mode. The ASCII and attribute bits are linked, and therefore, for each character, these bits are stored in the same addressable location of memory 206. The font bits associated with each character, however, are often not stored in the same addressable memory location as their associated ASCII and attribute bits.

In accordance with the present invention, to display characters in a row of monitor 250 during the VGA alphanumeric mode, VGA controller 215 retrieves the ASCII and attribute bits for all such characters (i.e., 80 characters or 132 characters in wide-text mode) and stores the retrieved ASCII and attribute bits in storage space, e.g., 220a of local memory 220, which may be a cache memory. The font and unused bits that are also retrieved from memory 206 during the retrieval of ASCII and attribute bits are discarded. Next for each such character, using the ASCII and attribute bits, the associated font address is computed. Next, for each character, the font bits are retrieved from memory 206 using a burst read operation and in accordance with the font's computed address. Accordingly, because the font bits associated with each character are stored in neighboring rows of the memory, there is at most one page miss per font retrieved from memory 206. The font bits associated with each character are thereafter stored in one of the addressable locations of cache memory 230. In this manner, the font bits associated with the remaining characters of the row are also retrieved and stored in local cache memory 230. The font bits associated with all of the 80 (or 132) characters in the row are for example, stored in storage space 230a of local cache memory 230. Thereafter, the font bits stored in storage space 230a are scanned out to be used in the display of the characters. It is understood that in some embodiments, cache memories 220 and 230 may be the same physical cache memory.

In some embodiments, the ASCII and attribute bits associated with the characters in a second row are also retrieved in the same manner as described above in connection with the first row of characters, and stored in, e.g. storage location 220b of cache memory 220. The storing of the ASCII and attribute bits associated with the characters in the second row in storage location 220b occurs while the ASCII and attribute bits associated with the characters in the first row remain stored in storage location 220a.

In some embodiments, to further facilitate the character display, the fonts associated with the characters in a second row are also retrieved in the same manner as described above in connection with the first row of characters, and subsequently stored in, e.g., storage space 230b of cache memory 230. The storing of the font associated with the characters in the second row in storage space 230b may occur while the fonts associated with the characters in the first row remain stored in storage space 230a. Alternatively, the storing of the fonts associated with the characters in the second row in storage space 230b may occur as the fonts associated with the characters in the first row and stored in storage space 230a are scanned out.

As is known to those skilled in the art, VGA controller 215 is a isochronous controller and is thus sensitive to the read latency associated with memory 206. Moreover, because in embodiments such as 200 and 260 shown in FIGS. 5A and 5B above, MCU 204 and GPU 270 are disposed on two separate ICs, the read latency associated with memory 206 may be relatively large. Advantageously in accordance with the present invention, memory read latencies of, e.g. 7 microseconds, are handled by VGA controller 215 while maintaining VGA compatibility.

Figure 7:
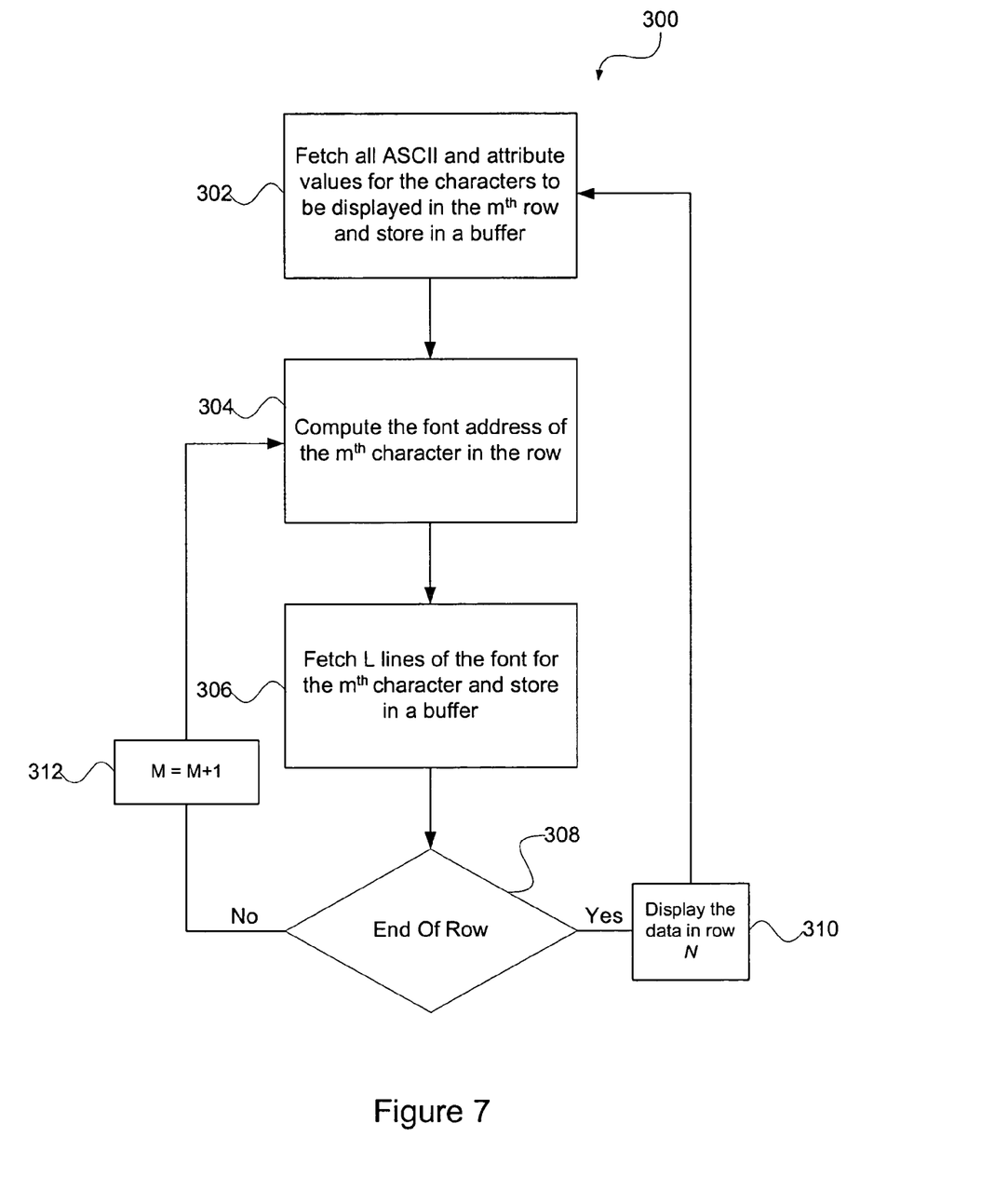
FIG. 7 is a flowchart of steps carried out by a VGA controller to display data in the VGA alphanumeric mode, in accordance with one embodiment of the present invention.

FIG. 7 is a flowchart 300 of steps carried out by VGA controller 215 (FIG. 6) to display the characters in row N in the VGA alphanumeric mode, in accordance with one embodiment of the present invention. At step 302, the ASCII and attribute bits for all such characters are fetched and stored. Next, at step 304, the font address for the $m^{th}$ character in row N is computed. It is understood that in the VGA alphanumeric mode, m is an integer varying from 1 to 80 (or 1 to 132 in wide-text modes). At step 306, the computed address for the $m^{th}$ character is used to fetch—using a burst read operation—the associated font for each of the L lines that form the font height of the characters disposed in row N. At step 308, a determination is made as to whether the $m^{th}$ character is the last character in the row, i.e., whether the end of the row has been reached. If so, as seen in step 310, the data in row N is ready to be scanned out and displayed. If not, at step 312, m is incremented by 1 and the process moves to step 304 to be repeated.

The above embodiments of the present invention are illustrative and not limitative Various alternatives and equivalents are possible. For example, the invention is not limited by the type of local memory, cache or otherwise, used to store the ASCII, attribute and font bits associated with the characters. Nor is the invention limited by the type of main memory or the memory controller unit which provides access to the main memory. The invention is not limited by the number of integrated circuits in which the present invention may be disposed. The invention is not limited by the number of characters to be displayed in each row of the monitor. Nor is the invention limited by the number of parameters associated with each character. The invention is not limited by the type of application, graphics or otherwise, that the processing unit, in which the graphics controller of the present invention may be embodied. The invention is not limited to any specific type of process technology, e.g., CMOS, Bipolar, or BICMOS that may be used to manufacture the present invention. Other additions, subtractions or modifications are obvious in view of the present invention and are intended to fall within the scope of the appended claims.

What is claimed is:

1. A method for processing characters to be displayed on a monitor in a first mode, the method comprising:
 performing multiple memory accesses of a memory with a memory controller to retrieve a first set of N parameter values each associated with a different one of N characters to be displayed in a row of the monitor, wherein the multiple memory accesses cause a memory latency;
 sending the retrieved values from the memory controller to a graphics processing unit using an isochronous VGA controller,
 wherein the isochronous VGA controller is disposed in the graphics processing unit and the graphics processing unit is disposed in a video adapter,
 wherein the memory controller and the graphics processing unit are disposed on two separate integrated circuits and the memory latency handled by the VGA controller while maintaining VGA compatibility,
 wherein the memory controller is disposed as an integral part of a computer system, wherein the video adapter is an add-in card coupled to the memory controller via a communication link;
storing the retrieved first set of N parameter values;
computing N memory addresses each computed using a different one of the retrieved first set of N parameter values;
performing burst memory operations to retrieve a second set of N parameter values, each parameter value of the second set of N parameter values associated with a different one of the N characters to be displayed in the row of the monitor;
storing the retrieved second set of N parameter values; and
scanning out the stored second set of N parameter values for use in the display of the N characters of the row.

2. The method of claim 1 wherein each parameter value of the first set of N parameter values includes a pair of ASCII and attribute parameter values, and wherein each pair of ASCII and attribute parameter values is associated with a different one of the N characters.

3. The method of claim 2 wherein each parameter value of the second set of N parameter values is a font parameter value associated with a different one of the N characters.

4. The method of claim 3 further comprising:
storing a second set of N ASCII and attribute parameter values associated with N characters of a second row of the monitor while the first set of N ASCII and attribute parameter values remain stored.

5. The method of claim 4 further comprising:
storing a second set of N font parameter values associated with the N characters of the second row while the first set of N font parameter values remain stored.

6. The method of claim 4 further comprising:
storing a second set of N font parameter values associated with the N characters of the second row while the first set of N font parameter values are scanned out.

7. The method of claim 5 wherein the ASCII and attribute parameter values associated with each character are stored in a same addressable location of a memory.

8. The method of claim 7 wherein performing the burst memory operations include performing N burst memory operations.

9. The method of claim 8 wherein said mode is a VGA alphanumeric mode and said N is either an integer varying from 1 to 80 or an integer varying from 1 to 132.

10. A graphics processing unit coupled to a display monitor adapted to display characters, the graphics processing unit comprising:
an interface to a memory controller for accessing stored information;
at least one local memory unit, and
a graphics controller unit configured to retrieve a first set of N parameter values, each associated with a different one of N characters to be displayed in a row of the monitor, and to store the retrieved first set of N parameter values in the at least one local memory unit, said graphics controller unit further configured to compute N memory addresses each computed using a different one of the N parameter values and further configured to perform burst memory operations to retrieve a second set of N parameter values using the computed addresses, each parameter value of the second set of N parameter values being associated with a different one of the N characters to be displayed in the row of the monitor;
wherein said graphics controller unit is further configured to store the retrieved second set of N parameter values in the at least one local memory unit, and is further configured to scan out the stored second set of N parameter values for use in the display of the N characters;
wherein the graphics controller unit comprises an isochronous VGA controller used to handle memory latency caused by retrieving N parameter values or caused by having the memory controller and the graphics processing unit being disposed on two separate integrated circuits, while maintaining VGA compatibility,
wherein the memory controller is disposed as an integral part of a computer system,
wherein the isochronous VGA controller is disposed in the graphics processing unit and the graphics processing unit is disposed in a video adapter,
wherein the video adapter is an add-in card coupled to the memory controller via a communication link.

11. The graphics processing unit of claim 10 wherein each parameter value of the first set of N parameter values includes a pair of ASCII and attribute parameter values, and wherein each pair of ASCII and attribute parameter values is associated with a different one of the N characters.

12. The graphics processing unit of claim 11 wherein each parameter value of the second set of N parameter values is a font parameter value associated with a different one of the N characters.

13. The graphics processing unit of claim 12 wherein said graphics controller unit is further configured to store a second set of N ASCII and attribute parameter values associated with N characters of a second row of the monitor in the at least one local memory unit while the first set of N ASCII and attribute parameter values remain stored.

14. The graphics processing unit of claim 13 wherein said graphics controller unit is further configured to store a second set of N font parameter values associated with the N characters of the second row while the first set of N font parameter values remain stored.

15. The graphics processing unit of claim 13 wherein said graphics controller unit is further configured to store a second set of N font parameter values associated with the N characters of the second row while the first set of N font parameters are scanned out.

16. The graphics processing unit of claim 10 wherein said characters are displayed in a VGA alphanumeric mode and said N is either an integer varying from 1 to 80 or an integer varying from 1 to 132.

17. A computer system comprising:
a central processing unit further comprising a memory controller;
a system memory coupled to the memory controller;
a display monitor adapted to display characters;
a media access controller unit; and
a graphics processing unit comprising:
at least one local memory unit,
a graphics controller unit configured to retrieve a first set of N parameter values, each associated with a different one of N characters to be displayed in a row of the monitor, and to store the retrieved first set of N parameter values in the at least one local memory unit, said graphics controller unit further configured to compute N addresses of the system memory each computed using a different one of the N parameter values and further configured to perform burst read operations of the system memory to retrieve a second set of N parameter values using the computed addresses, each parameter value of the second set of N parameter values being associated with a different one of the N characters to be displayed in the row of the monitor;

wherein said graphics controller unit is further configured to store the retrieved second set of N parameter values in the at least one local memory unit, and is further configured to scan out the stored second set of N parameter values for use in the display of the N characters;

wherein the graphics controller unit comprises an isochronous VGA controller used to handle memory latency caused by retrieving N parameter values or caused by having the memory controller and the graphics processing unit being disposed on two separate integrated circuits, while maintaining VGA compatibility, wherein the memory controller is disposed as an integral part of a computer system, wherein the isochronous VGA controller is disposed in the graphics processing unit and the graphics processing unit is disposed in a video adapter, wherein the video adapter is an add-in card coupled to the memory controller via a communication link.

18. A computer system comprising:
a central processing unit;
a system memory;
a control unit coupled to the central processing unit and comprising a memory controller configured to access the system memory;
a display monitor adapted to display characters;
a media access controller unit; and
a graphics processing unit comprising:
   at least one local memory unit,
   a graphics controller unit configured to retrieve a first set of N parameter values, each associated with a different one of N characters to be displayed in a row of the monitor, and to store the retrieved first set of N parameter values in the at least one local memory unit, said graphics controller unit further configured to compute N addresses of the system memory each computed using a different one of the N parameter values and further configured to perform burst read operations of the system memory to retrieve a second set of N parameter values using the computed addresses, each parameter value of the second set of N parameter values being associated with a different one of the N characters to be displayed in the row of the monitor;

wherein said graphics controller unit is further configured to store the retrieved second set of N parameter values in the at least one local memory unit, and is further configured to scan out the stored second set of N parameter values for use in the display of the N characters;

wherein the graphics controller unit comprises an isochronous VGA controller used to handle memory latency caused by retrieving N parameter values or caused by having the memory controller and the graphics processing unit being disposed on two separate integrated circuits, while maintaining VGA compatibility, wherein the memory controller is disposed as an integral part of a computer system, wherein the isochronous VGA controller is disposed in the graphics processing unit and the graphics processing unit is disposed in a video adapter, wherein the video adapter is an add-in card coupled to the memory controller via a communication link.

* * * * *